No. 669,782. Patented Mar. 12, 1901.
E. W. GROESCHEL.
HOOK AND EYE.
(Application filed Aug. 21, 1899.)
(No Model.)
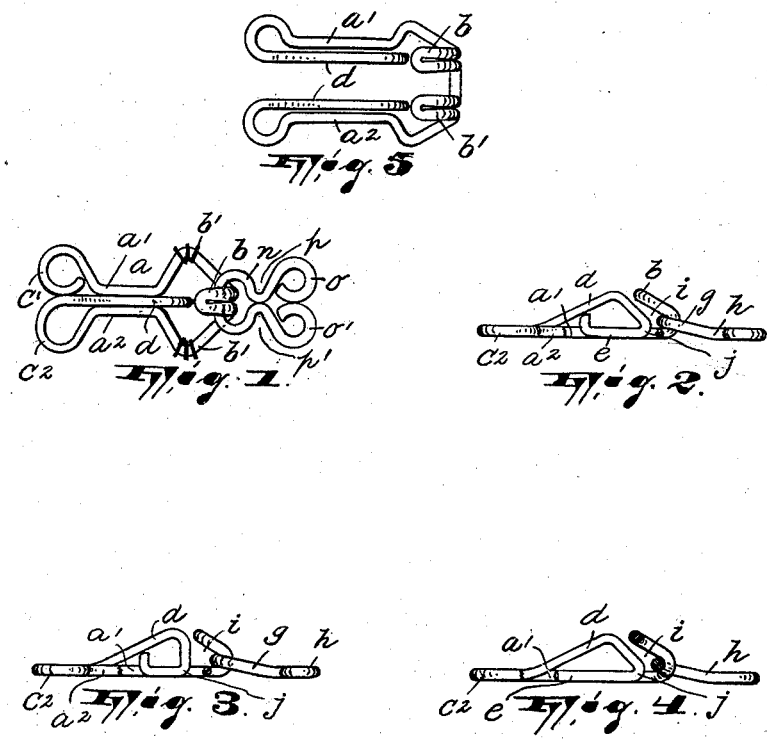

UNITED STATES PATENT OFFICE.

EDWIN W. GROESCHEL, OF JERSEY CITY, NEW JERSEY.

HOOK AND EYE.

SPECIFICATION forming part of Letters Patent No. 669,782, dated March 12, 1901.

Application filed August 21, 1899. Serial No. 727,887. (No model.)

*To all whom it may concern:*

Be it known that I, EDWIN W. GROESCHEL, a citizen of the United States, residing in Jersey City, in the county of Hudson and State of New Jersey, have invented certain new and useful Improvements in Hooks and Eyes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention constitutes an improvement in hooks and eyes, the improvement being directed to the device shown, described, and claimed in Letters Patent No. 628,143, granted to me July 4, 1899. In the device covered by this patent the tip or extremity of a certain tongue, which projects upwardly from the shank portion of the hook and coacts with the bill thereof to prevent unintentional separation of the eye from the hook, is not sheathed or protected, and consequently it is within the range of possibility that the loop of the eye should accidentally get caught beneath the tongue, so that the parts could not readily be disengaged when it is desired to effect this—that is to say, the eye would have to be first disengaged from the tongue before the hook and eye could be disengaged. Moreover, the unprotected end of the tongue is likely to get caught in the fabric. In order to overcome these objections which go more or less to prejudice the value of the old or patented form of hook and eye, I have so constructed the hook portion of the device that its tongue is perfectly sheathed or protected, is so arranged as to confine the eye member against appreciable movement, and is at the same time free to move, so as to allow said eye member to be readily engaged and disengaged from the hook, being, nevertheless, adequately secured against accidental dislocation, and it is in a hook so constructed that my present invention consists.

The invention is fully illustrated in the accompanying drawings, wherein corresponding letters of reference indicate like parts, and wherein—

Figure 1 is a top plan view of one form of my invention. Fig. 2 is a view in side elevation of another form of the invention, and Fig. 3 is a view in side elevation of the device shown in Fig. 1. Fig. 4 is a view in side elevation of the device shown in Fig. 2, but illustrating a slight modification thereof. Fig. 5 is a plan view of a duplex form of the hook member of my device.

In Figs. 2 to 4, inclusive, a portion of the hook is shown as broken away to clearly illustrate the manner of sheathing its tongue.

The hook member of the device consists of a single piece of wire so bent as to form the shank $a$, the bill $b$, and the eyelets $c'$ $c^2$, the same being the essential parts of a device of this nature. The shank members $a'$ $a^2$ are spaced, and in the body portion of the hook they extend substantially parallel, while adjacent the bill, as at $b'$, they are bent sharply outward approximately as far as the eyelets extend, thus providing additional points for securing the device in place to the fabric. The bill is made comparatively short and projects from the plane of the shank and its eyelets at about an angle of forty-five degrees. One of the eyelets, $c'$, is formed at one extreme end of the wire, whereas the other, $c^2$, is situated some distance from the other end of the wire, the free end portion of the wire thus provided for being extended toward the point of the bill at an incline to the shank to form a tongue $d$. Said tongue nearly contacts with the point of the bill and then is deflected downwardly, the bend being a gradual one. In Figs. 1, 3, and 5 the extremity of the tongue projects perpendicularly with reference to the plane of the shank, while in the remaining figures it extends at an incline thereto and away from the eyelet end of the device.

Now in any of the forms of my invention I propose to rebend the extremity of the tongue and extend it far enough rearwardly so that it will approximately be in contact with the body portion of the tongue at some point thereof, thus substantially producing a loop in the tongue. As shown in Figs. 2, 3, and 4, the rebent portion $e$ of the tongue extends rearwardly in the plane of the shank of the hook, in Fig. 4 projecting far enough till it reaches or practically contacts with the inclined portion of the tongue, and in Figs. 2 and 3 being again bent near its tip, which latter projects upwardly, and thus contacts with the body portion of the tongue.

It will be seen that in the device shown in Figs. 1 to 4, inclusive, it will be absolutely impossible for the loop $g$ of the eye member $h$ of the device to be moved out of the space $i$, formed by the bill and the tongue and in which it is intended to rest, except by the outlet afforded between the tip of the bill and the adjacent bend in the tongue. In the form of the invention shown in Fig. 5, though it might be in some degree possible for the loop of the eye to be slipped past the bend at $j$, (however, this will never occur so long as the members are secured properly to the goods,) it may be readily dislodged and brought again into the space $i$ by the next slightest pull of the eye against the inclined rebent extremity $f$, and so the movement of said eye member is normally confined. This is because the loop of the tongue not only approaches the tip of the bill, but dips or projects down into the plane of the shank members. Furthermore, although the loop formed in the tongue projects at its rear end into the narrow space between the parallel portions of the shank members, and so is confined against accidental dislocation, at the same time the pliability of the tongue is preserved, because the major portion of its loop is vertically opposed to the space formed between the outwardly-bent anchorages.

The eye member of the device may be of any well-known and suitable construction. However, in Fig. 1 I show a special form of eye, which may be secured in position to the garment at several points. It consists of a single piece of wire comprising, essentially, a loop $n$ and eyelets $o$ $o'$. The loop is transversely elongated and the two ends of the wire composing the device extend from the loop, which is practically closed at all points, divergently and then toward each other, or inwardly, thus forming the eyelets $o$ $o'$ and also producing opposing unbroken incurvations $p$ $p'$ for the reception of securing-threads employed auxiliary to the usual securing-threads which the eyelets receive. The loop and the eyelets are close together, and thus make the recesses which the incurvations produce both narrow and deep.

The device shown in Fig. 5 constitutes a duplex hook—i. e., a hook wherein there are two bills and two tongues provided—the entire device in every particular, with the exception, of course, that it is broader, being exactly like the hook shown in Fig. 1. The end of the tongue may of course be protected in any of the ways which I show in the remaining figures. This form of hook is well adapted for use where it is desirable that the eye should have contact with the hook at two points, so as to obviate any undue pivotal lateral movement of the hook and eye relatively to each other. Therefore, if desired, one of the two bills shown may be dispensed with and a single bill, somewhat widened of course, employed instead.

In connecting the hook and eye the wire of the loop of the eye is simply pressed against the hook in the exterior recess between the tip of the bill and the bend in the tongue, whereupon it will readily enter the space $i$. In order to separate the eye from the hook, it is only necessary to grasp the members with both hands and give them a reverse twisting motion, permitting the loop of the eye to seat itself preferably in the bend of the bill, whereupon the tongue of the hook member will be pushed to one side until the eye has cleared. However, the separation of the members may of course be accomplished by simply reversing the above-described operation whereby they are connected.

Having thus fully described my invention, what I claim as new, and desire to secure by Letters Patent, is—

1. A hook for a hook and eye consisting of the eyelets, bill and shank, the latter comprising two substantially parallel members, and a tongue projecting toward said bill from the eyelet end of the hook and being deflected near its free end downwardly and thence having its free end turned rearwardly and projecting into contact, or approximate contact, with the body portion of said tongue to thus form a loop in the latter, said shank members being relatively close to each other for their greater portion and being bent near their forward ends outwardly or away from each other to form an appreciable space between them, and said loop having its major portion opposed to said space and having the end portion thereof adjacent the eyelet end of the hook engaged between those ends of the contiguous portions of said members which are adjacent said loop, substantially as described.

2. A hook for a hook and eye consisting of the eyelets, bill and shank, the latter comprising two substantially parallel members, and a tongue projecting toward said bill from the eyelet end of the hook and being deflected near its free end downwardly and forwardly in an incline and thence having its free end turned rearwardly and projecting into approximate contact with the body portion of said tongue to thus form a loop in the latter, said shank members being relatively close to each other for their greater portion and being bent near their forward ends outwardly or away from each other to form an appreciable space between them, and said loop having its major portion opposed to said space and having the end portion thereof adjacent the eyelet end of the hook engaged between those ends of the contiguous portions of said members which are adjacent said loop, substantially as described.

In testimony that I claim the foregoing I have hereunto set my hand this 18th day of August, 1899.

EDWIN W. GROESCHEL.

Witnesses:
JOHN W. STEWARD,
WILLIAM GROESCHEL.